(12) United States Patent
Valentine et al.

(10) Patent No.: US 6,442,394 B1
(45) Date of Patent: Aug. 27, 2002

(54) SYSTEMS AND METHODS FOR PROVIDING VEHICULAR TRAFFIC INFORMATION TO A MOBILE STATION (MS) THROUGH A WIRELESS TELECOMMUNICATIONS NETWORK

(75) Inventors: Eric Valentine, Plano; Vladimir Alperovich, Dallas; Walt Evanyk, Plano, all of TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/410,470

(22) Filed: Oct. 1, 1999

(51) Int. Cl.[7] .................................................. H04Q 7/20
(52) U.S. Cl. ........................ 455/456; 455/422; 455/414; 455/550; 340/905
(58) Field of Search ................................. 455/422, 414, 455/412, 550, 556, 560, 561, 566, 575, 456; 340/905

(56) References Cited

U.S. PATENT DOCUMENTS 5,131,020 A * 7/1992 Liebesny et al. ........... 340/905
6,014,090 A * 1/2000 Rosen et al. ................ 340/905
6,031,490 A * 2/2000 Forssen et al. ............. 455/456
6,091,956 A * 7/2000 Hollenberg ................. 455/456
6,108,554 A * 8/2000 Kawamoto ................. 455/456

* cited by examiner

Primary Examiner—Doris H. To
(74) Attorney, Agent, or Firm—Roger S. Burleigh

(57) ABSTRACT

Apparatus, methods and systems relating to providing vehicular traffic information through a wireless telecommunications network. An exemplary system includes a geographic location system (GLS), a database containing vehicular roadway information, and a vehicular traffic determination node. The GLS is operative to determine the approximate physical location of at least one Mobile Station (MS) in communication with the wireless telecommunications network. The vehicular traffic determination node is operative to i) receive and correlate the approximate physical location of the MS to the vehicular roadway information to generate vehicular traffic information, and ii) communicate the vehicular traffic information to the wireless telecommunications network; the wireless telecommunications network can selectively-transmit or broadcast the vehicular traffic information.

17 Claims, 2 Drawing Sheets

SYSTEMS AND METHODS FOR PROVIDING VEHICULAR TRAFFIC INFORMATION TO A MOBILE STATION (MS) THROUGH A WIRELESS TELECOMMUNICATIONS NETWORK

TECHNICAL FIELD OF THE INVENTION

The present invention is directed, in general, to wireless communications systems and, more specifically, to apparatus, methods and systems for providing vehicular traffic information through a wireless telecommunications network.

BACKGROUND OF THE INVENTION

The world is currently experiencing revolutionary changes in communications systems, brought about, in part, by the general availability and evolution of wireless telephony systems. Immediately after the first mobile user headed off into the sunset with a cellular telephone, or Mobile Station (MS), however, someone else wondered where they went. Unlike conventional wireline telephones, wireless callers are not usually associated with a fixed location, which provides many benefits such as freedom of use over large geographical areas. Because the location of a Mobile Station (MS), or wireless device in general, is usually not fixed, however, such freedom can be a detriment to a cellular user, such as when a user requires emergency assistance. For example, in a conventional wireless network, the location of a MS can not be determined when a user places a call to a public safety answering point (PSAP), such as a call to "911."

Across the United States, various public safety agencies have reported that 911 calls from cellular telephones now constitute between 15 percent and 40 percent of all 911 calls received; recent statistics indicate that over 7 million cellular 911 calls are placed per year. Although public safety agencies desire to provide the same level of service to cellular callers as they do to landline callers, they are hampered by a great divergence in technology. The issue of supporting cellular 911 calls has become serious enough that on Feb. 12, 1998, the Federal Communications Commission (FCC) and the Cellular Telephone Industry Association (CTIA) announced an agreement on a five-year implementation plan for deploying geographical location systems within all wireless networks.

In response to the FCC/CTIA implementation plan, various systems for providing the geographic location of MSs have been developed or proposed. The systems are generally network-based solutions that "overlay" a wireless carrier's existing network. As an overlay system, such systems monitor the numbers of all calls placed from MSs within a wireless network and, upon detecting a 911 call, initiate a procedure to determine the approximate geographic location of the MS. In addition to the desire to provide geographic location information for a MS placing a 911 call, the availability of such information can also make possible many useful services, such as location-sensitive billing. Although the capability to provide such services will allow service providers to recoup some of the investment that must be made to comply with the FCC/CTIA requirement for the geographic location of 911 calls, a service provider's return-on-investment will be maximized if further uses of such information are developed; i.e., a service provider can increase revenues by offering premium services that use geographic location information.

Accordingly, what is needed in the art are novel premium telecommunications services based on the use of geographic location information for MSs in a wireless network; such premium services should preferably take advantage of the existing infrastructure of wireless telecommunications networks.

SUMMARY OF THE INVENTION

To address the above-discussed deficiencies of the prior art, the present invention relates to apparatus, methods and systems for providing vehicular traffic information through a wireless telecommunications network. An exemplary system includes a geographic location system (GLS), a database containing vehicular roadway information, and a vehicular traffic determination node. The GLS is operative to determine the approximate physical location of at least one Mobile Station (MS) in communication with the wireless telecommunications network. The vehicular traffic determination node is operative to i) receive and correlate the approximate physical location of the MS to the vehicular roadway information to generate vehicular traffic information, and ii) communicate the vehicular traffic information to the wireless telecommunications network; the wireless telecommunications network can selectively-transmit or broadcast the vehicular traffic information.

In exemplary embodiments described hereinafter, a GLS determines the approximate physical location of a MS as a function of a predefined event. Predefined events can be, for example, the origination of a wireless call by a MS, the origination of a wireless call to a MS, the termination of a wireless call by a MS, the termination of a wireless call to a MS, the receipt of Short Message Service (SMS) information by a MS, and a periodic location update of a MS. Various GLS technologies can be utilized, such as Time Difference of Arrival (TDOA) or Angle of Arrival (AOA) signaling techniques to determine an approximate physical location of a MS. Moreover, the GLS can form a portion of the wireless telecommunications network or can be an independent system, such as the satellite-based Global Positioning System.

The vehicular roadway information preferably includes information such as the physical locations of vehicular roadways, the number of traffic lanes of each vehicular roadway, and the nominal speed limits of each vehicular roadway. Upon correlating the approximate physical location of a MS to the vehicular roadway information, the vehicular traffic information can include, for example, a physical roadway location of a vehicle associated with a MS, a maximum speed of a vehicle associated with a MS, a minimum speed of a vehicle associated with a MS, and an average speed of a vehicle associated with a MS.

The vehicular traffic information can be communicated to the wireless telecommunications network for transmission to a MS; the information can be selectively-transmitted to specific MSs or broadcast to all MSs traveling within a network or a portion thereof. Preferably, a MS includes, or is coupled to, a display for visually presenting the vehicular traffic information to a MS user. The vehicular traffic information can also be communicated to other locations, such as a traffic management center.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which.

DETAILED DESCRIPTION

Figure 1:
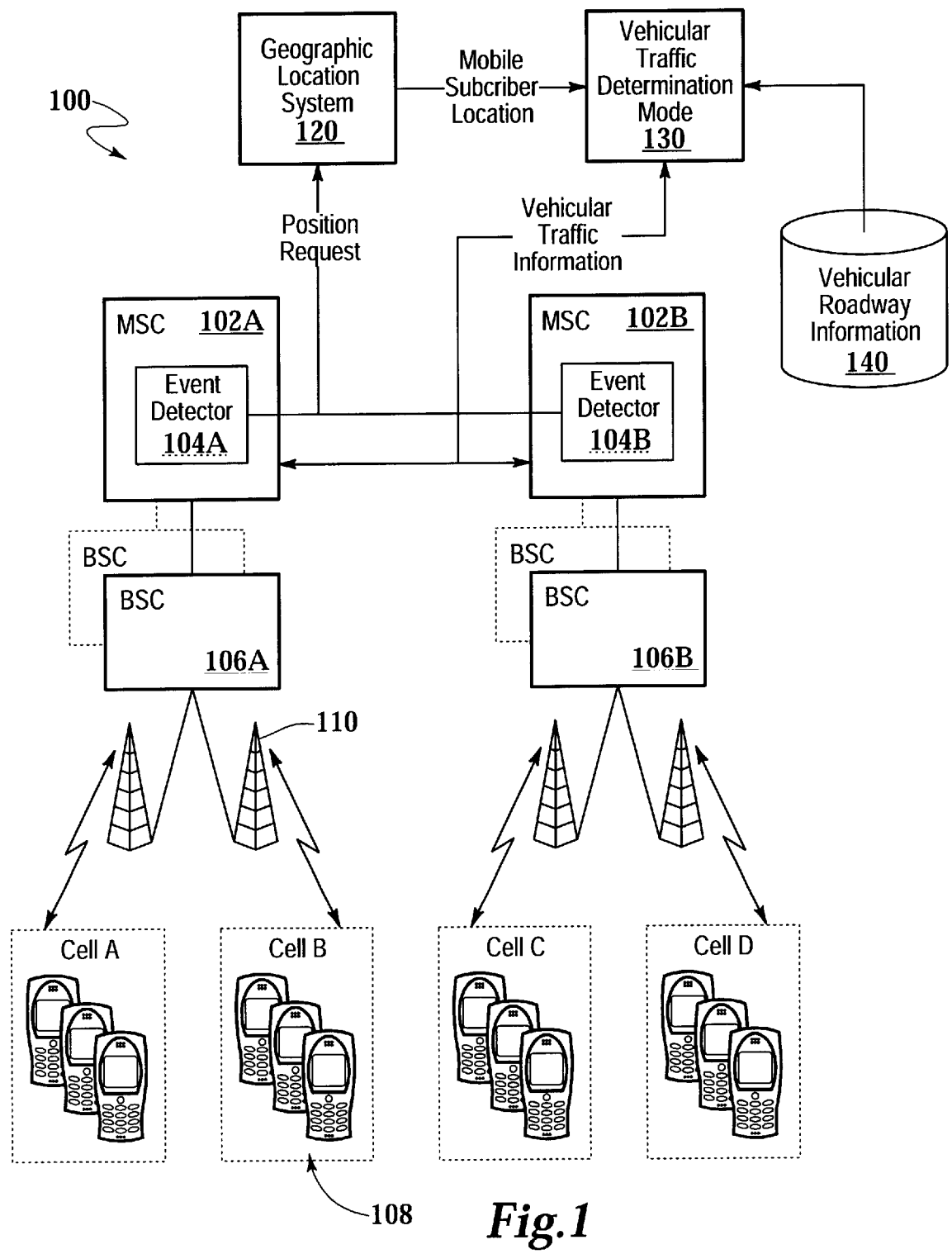
FIG. 1 illustrates an exemplary wireless telecommunications network employing a vehicular traffic information system in accordance with the principles disclosed herein.

In order to understand better the features and advantages of the present invention, reference is made first to FIG. 1, which illustrates an exemplary wireless telecommunications network employing a vehicular traffic information system, jointly referenced 100, in accordance with the principles disclosed herein. A conventional wireless telecommunications network includes one or more Mobile-services Switching Centers (MSCs), such as MSC 102A and 102B, each of which are associated with one or more Base Station Subsystems (BSSs). A BSS includes one or more Base Station Controllers (BSCs), such as BSC 106A and 106B, each of which is associated with one or more Base Transceiver Stations (BTSs), generally designated 110. Each BTS has a geographical service area referred to as a "cell," and a Mobile Station (MS), such as MS 108, communicates with the network through radio communications with the various BTSs as the MS physically moves from one cell to another, such as from Cell B to Cell C.

Although it is possible for a wireless telecommunications network to identify the location of a MS as being within the geographical area of a particular cell, the size of such cells can be many square miles and, thus, it is not possible for a conventional telecommunications network to precisely determine the physical location of a MS. To provide more accurate information regarding the location of a MS, a wireless telecommunications network must rely on the services of a geographic location system 120. A geographic location system 120 can use various techniques, such as Time Difference of Arrival (TDOA) or Angle of Arrival (AOA), to identify the approximate physical location of a MS.

A conventional geographic location system is typically a network-based solution that "overlays" a wireless carrier's existing network. As an overlay system, the geographic location system monitors the dialed numbers of all calls placed by a MS. Upon detecting, for example, a 911 call, the geographic location system initiates a procedure to determine the approximate geographic location of the MS. The geographic location system can then communicate the MS location to the wireless telecommunications network. Alternatively, or in addition, the geographic location system can communicate the MS location directly to a public safety answering point (PSAP) or any other location, either through the wireless telecommunications network or via a public switched telephone network (PSTN). A particular problem with such "overlay" geographic location systems is that they are typically independent systems that receive no assistance from an existing wireless network and, thus, require a great deal of hardware, or processing resources, that is redundant to that already available in a wireless network. For example, a MSC has the capability to determine the called number of a call placed from a MS 108 and, thus, a called-number detector in a geographic location system is redundant. Furthermore, a conventional overlay geographic location system does not have access to other events associated with the operation of a MS that might be used to trigger the determination of the geographic location of the MS. These disadvantages can be overcome by providing an event detector within the wireless telecommunications network.

As further illustrated in FIG. 1, the exemplary wireless telecommunications network includes integral event detectors, 104A and 104B, to trigger the operation of geographic location system 120. As noted previously, a conventional MSC has the integral capability to detect the called number of a call placed from a MS 108. In addition to the capability of detecting called numbers, a MSC has the further capability to detect various other "events" that are not readily accessible to a conventional "overlay" geographic location system. For example, the integral event detector 104 can monitor for the occurrence of events such as the origination of a wireless call by a MS, the origination of a wireless call to a MS, the termination of a wireless call by a MS (including a "dropped call"), the termination of a wireless call to a MS, the receipt of Short Message Service (SMS) information by a MS, a periodic location update of a MS, and many other user-definable events associated with a MS.

Employing the principles disclosed herein, any "event" or "parameter" available to a MSC, or other component, within a wireless telecommunications network can be used to selectively trigger a request to the geographic location system 120 to obtain the geographic location of a MS. As used herein, "event" is broadly defined as the occurrence of any predefined action, or reaction, within a wireless telecommunications network, such as the origination or termination of a wireless call by a MS, the origination or termination of a wireless call to a MS; such events may also include an occurrence intermediate to the origination and termination of a call, such as a "dropped call," or an action taken by a mobile subscriber during a call, such as pressing a button on a MS to request the user's current location.

As more fully described hereinafter, the principles disclosed herein can be employed in a conventional wireless telecommunications network, such as a Public Land Mobile Network (PLMN); the invention, however, is not limited to use in terrestrial-based wireless telecommunications systems, or to terrestrial-based wireless positioning systems. In preferred embodiments, the event detector 104 is a computer processing system; in terrestrial-based embodiments, a conventional computer processing system in a Mobile-services Switching Center (MSC) can be programmed to provide the event detector functions disclosed herein. Furthermore, if a MS is equipped with Global Positioning System (GPS) capabilities, the wireless positioning system can be the satellite-based GPS. In satellite-based GPS embodiments, a request for position of the MS could be generated by a MSC and transmitted to the MS; the MS could obtain its location using its satellite-based GPS capabilities, and then relay the location information to the MSC. Those skilled in the art will readily conceive of other system configurations that can be adapted to employ the principles disclosed herein; all such embodiments are intended to be within the scope of the claims recited hereinafter.

Upon receiving a position request from the wireless telecommunications network, such as from an event detector 104, the geographic location system 120 determines the approximate geographic position of the identified MS and communicates the MS location to a vehicular traffic determination node 130; a vehicular traffic determination node 130 can be a general- or specific-purpose computer processing system. A database containing vehicular roadway information 140 is accessible by the vehicular traffic determination node 130 to retrieve physical roadway information associated with the geographic area within which the MS is located. The vehicular traffic determination node correlates the MS location to the vehicular roadway information to generate vehicular traffic information, as described hereinafter. The vehicular traffic information can be communicated to the wireless telecommunications network, such as to an MSC 102, for transmission to a MS 108. Alternatively, or in addition thereto, the vehicular traffic information can be communicated to other systems, such as a traffic management center. A traffic management center can use the vehicular traffic information, for example, to dynamically-control traffic signals to regulate the flow of vehicular traffic.

Figure 2:
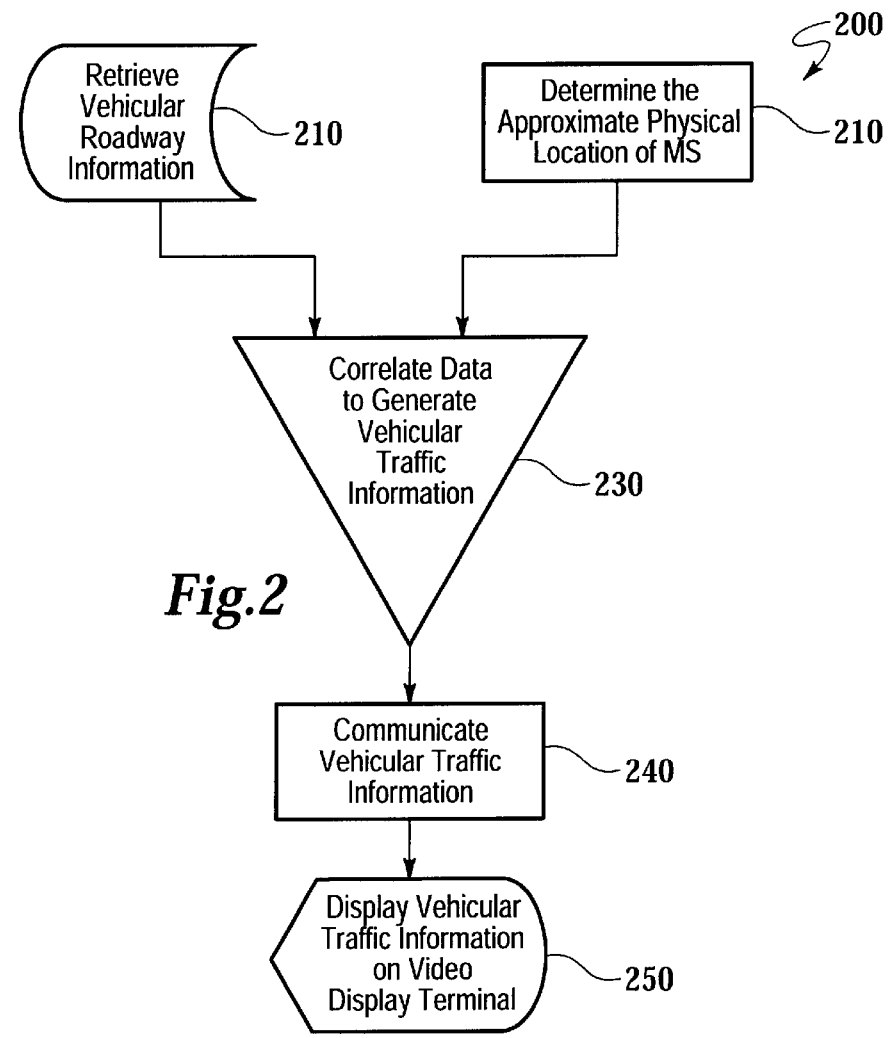
FIG. 2 illustrates an exemplary method for generating vehicular traffic information in accordance with the principles disclosed herein.

Referring now to FIG. 2, illustrated is an exemplary method 200 for generating vehicular traffic information in accordance with the principles disclosed herein. First, in a Step 210, a vehicular traffic determination node retrieves vehicular roadway information. The vehicular roadway information preferably includes information such as the physical locations of vehicular roadways, the number of traffic lanes of each vehicular roadway, and the nominal speed limits of each vehicular roadway. In a Step 220, a geographic location system determines the approximate physical location of a MS, and this information is communicated to a vehicular traffic determination node.

In a Step 230, the vehicular traffic determination node correlates the approximate physical location of a MS to the vehicular roadway information to generate the vehicular traffic information. By periodically determining and storing the physical location of a MS, the vehicular traffic determination node can generate vehicular traffic information that includes, for example, a physical roadway location of a vehicle associated a MS, a maximum speed of a vehicle associated with a MS, a minimum speed of a vehicle associated with a MS, and an average speed of a vehicle associated with a MS. The vehicular traffic information associated with a MS can be combined with the vehicular traffic information associated with other MSs to calculate additional vehicular traffic information, such as the average speed of vehicles along a certain roadway, or portion of a roadway.

When combining the vehicular traffic information associated with many MSs, statistical processes are preferably used to filter the combined data. For example, if a vehicular traffic determination node calculates the speed of each MS proximate to a particular roadway, and the speed of one MS is zero, the speed of that MS should be disregarded in calculating the average speed of traffic along that roadway; this situation can arise if a user of a MS has parked or is not actually traveling within a vehicle. Those skilled in the art are familiar with general statistical processes used to filter data; the broad principles of the present invention, however, do not require, and are not limited to, the use of such processes.

Next, in a Step 240, the vehicular traffic information is communicated by the vehicular traffic determination node to another system, such as a wireless telecommunications network; as noted previously, the vehicular traffic information can be communicated to other systems, such as a traffic management center. In a step 250, the system receiving the vehicular traffic information can display the information on a video display terminal.

Figure 3:
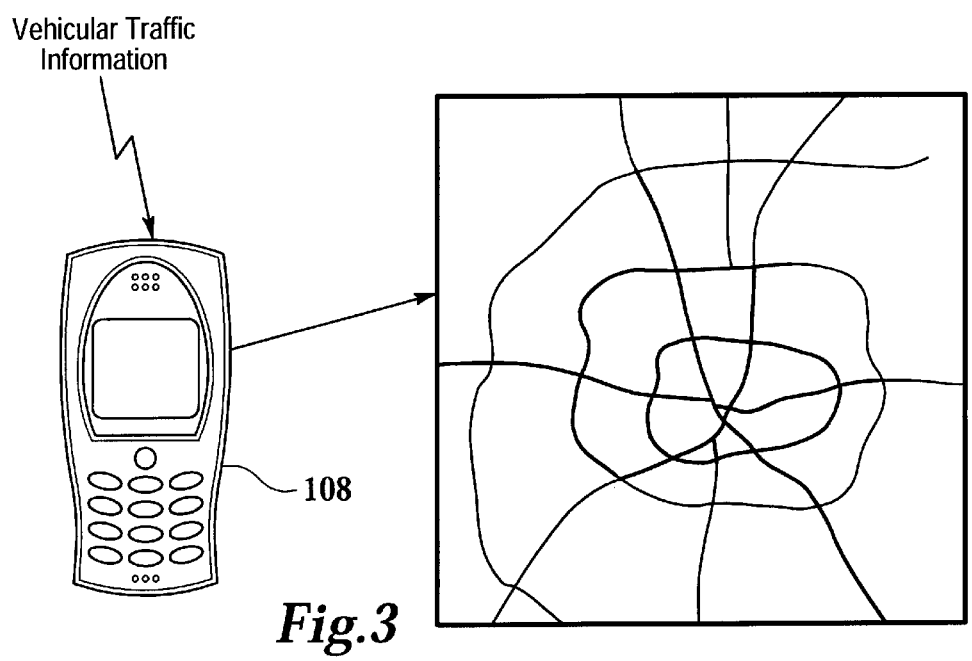
FIG. 3 illustrates an exemplary use of the vehicular traffic information generated according to the principles disclosed herein.

Finally, reference is made to FIG. 3, which illustrates an exemplary use of the vehicular traffic information generated according to the principles disclosed herein. In an exemplary embodiment, the vehicular traffic information is transmitted by a wireless telecommunications network to a MS 108. The MS 108 either includes or is coupled to a visual display terminal 310 for displaying a graphical representation of the vehicular traffic information. As illustrated in FIG. 3, a graphical representation of the vehicular traffic information can include a map of vehicular roadways proximate to the geographic position of the MS 108. The vehicular roadways can be selectively color-coded, for example, to identify certain vehicular traffic information. For example, vehicular roadways can be color-coded according to an average speed of vehicles traveling thereon. In addition, if the average speed of vehicles on a particular roadway is less that a pre-selected threshold, the roadway can be alternately flashed or displayed in a warning color, such as red. Those skilled in the art will readily perceive of alternative manners of displaying the vehicular traffic information; such alternative manners of display are intended to be within the scope of the claims recited hereinafter.

The present invention provides significant advantages to wireless communications systems, in general, and the invention is particularly advantageous in cellular communications networks. The principles disclosed herein take advantage of the requirement that wireless telecommunications networks provide geographic location information for wireless calls to public safety answering points (PSAPs), thereby allowing service providers to recoup some of the investment that must be made to comply with the FCC/CTIA requirement for the geographic location of 911 calls and, thus, to maximize their return-on-investment. Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A system for providing vehicular traffic information to a Mobile Station (MS) through a wireless telecommunications network said system comprising:

an event detector, said event detector operative to detect a predefined event associated with said MS. said predefined event being selected from the group consisting of:

the origination of a wireless call by said MS;
the origination of a wireless call to said MS;
the termination of a wireless call by said MS;
the termination of a wireless call to said MS;
the receipt of Short Message Service (SMS) information by said MS; and
a periodic location update of said MS;

a geographic location system (GLS), said GLS operative to determine the approximate physical location of at least one MS upon the receipt of a signal from said event detector, said event detector sending said signal upon the occurrence of said predefined event;

a database containing vehicular roadway information; and a vehicular traffic determination node coupled to said database, said vehicular traffic determination node operative to:
   i) receive and correlate said approximate physical location of said at least one MS to said vehicular roadway information to generate said vehicular traffic information, and
   ii) communicate said vehicular traffic information to said wireless telecommunications network.

2. The system recited in claim 1, wherein said GLS utilizes Time Difference of Arrival (TDOA) signaling techniques to determine said approximate physical location.

3. The system recited in claim 1, wherein said GLS utilizes Angle of Arrival (AOA) signaling techniques to determine said approximate physical location.

4. The system recited in claim 1, wherein said GLS comprises a satellite-based Global Positioning System.

5. The system recited in claim 1, wherein said wireless telecommunications network comprises a Public Land Mobile Network (PLMN).

6. The system recited in claim 1, wherein said vehicular roadway information includes data selected from the group consisting of:
   physical locations of vehicular roadways;
   number of traffic lanes of each said vehicular roadway; and
   nominal speed limits of each said vehicular roadway.

7. The system recited in claim 1, wherein said vehicular traffic information includes data selected from the group consisting of:
   a physical roadway location of a vehicle associated with said at least one MS;
   a maximum speed of a vehicle associated with said at least one MS;
   a minimum speed of a vehicle associated with said at least one MS; and
   an average speed of a vehicle associated with said at least one MS.

8. A method for providing vehicular traffic information to a Mobile Station (MS) in a wireless telecommunications network, said method comprising the steps of:
   determining the approximate physical location of at least one MS using a geographic location system (GLS), wherein said GLS determines said approximate physical location as a function of a predefined event associated with said MS, said predefined event being selected from the group consisting of:
     the origination of a wireless call by said MS;
     the origination of a wireless call to said MS;
     the termination of a wireless call by said MS;
     the termination of a wireless call to said MS:
     the receipt of Short Message Service (SMS) information by said MS: and a periodic location update of said MS;
   retrieving vehicular roadway information from a database;
   correlating said approximate physical location of said at least one MS to said vehicular roadway information to generate said vehicular traffic information; and, communicating said vehicular traffic information to a MS through said wireless telecommunications network.

9. The method recited in claim 8, wherein said GLS utilizes Time Difference of Arrival (TDOA) signaling techniques to determine said approximate physical location.

10. The method recited in claim 8, wherein said GLS utilizes Angle of Arrival (AOA) signaling techniques to determine said approximate physical location.

11. The method recited in claim 8, wherein said GLS utilizes a satellite-based Global Positioning System to determine said approximate physical location.

12. The method recited in claim 8, wherein said wireless telecommunications network comprises a Public Land Mobile Network (PLMN).

13. The method recited in claim 8, wherein said vehicular roadway information includes data selected from the group consisting of:
   physical locations of vehicular roadways;
   number of traffic lanes of each said vehicular roadway; and
   nominal speed limits of each said vehicular roadway.

14. The method recited in claim 8, wherein said vehicular traffic information includes data selected from the group consisting of:
   a physical roadway location of a vehicle associated with said at least one MS;
   a maximum speed of a vehicle associated with at said at least one MS;
   a minimum speed of a vehicle associated with said at least one MS; and
   an average speed of a vehicle associated with said at least one MS.

15. A vehicular traffic determination node for providing vehicular traffic information to a Mobile Station (MS) through a wireless telecommunications network, said vehicular traffic determination node operative to:
   i) receive the approximate physical location of at least one MS from a geographic location system (GLS), wherein said GLS determines said approximate physical location as a function of a predefined event associated with said MS, said predefined event being selected from the group consisting of: the origination of a wireless call by said MS;
     the origination of a wireless call to said MS:
     the termination of a wireless call by said MS;
     the termination of a wireless call to said MS;
     the receipt of Short Message Service (SMS) information by said MS; and
     a periodic location update of said MS;
   ii) correlate said approximate physical location of said at least one MS to vehicular roadway information to generate said vehicular traffic information; and
   iii) communicate said vehicular traffic information to said wireless telecommunications network.

16. The vehicular traffic determination node recited in claim 15, wherein said vehicular roadway information includes data selected from the group consisting of:
   physical location s of vehicular roadways;
   number of traffic lanes of each said vehicular roadway; and
   nominal speed limits of each said vehicular roadway.

17. The vehicular traffic determination node recited in claim 15, wherein said vehicular traffic information includes data selected from the group consisting of:
   a physical roadway location of a vehicle associated with said at least one MS;
   a maximum speed of a vehicle associated with said at least one MS;
   a minimum speed of a vehicle associated with said at least one MS; and
   an average speed of a vehicle associated with said at least one MS.

* * * * *